United States Patent
Kantrowitz et al.

(10) Patent No.: US 7,636,032 B2
(45) Date of Patent: Dec. 22, 2009

(54) ACTIVE RFID TAG WITH NEW USE AUTOMATIC UPDATING

(76) Inventors: Allen B. Kantrowitz, 190 Torrey Woods Rd., Williamstown, MA (US) 01267; In Ki Mun, 1 Apple Ct., Nanuet, NY (US) 10958

( * ) Notice: Subject to any disclaimer, the term of this patent is extended or adjusted under 35 U.S.C. 154(b) by 389 days.

(21) Appl. No.: 11/565,129

(22) Filed: Nov. 30, 2006

(65) Prior Publication Data

US 2007/0236339 A1    Oct. 11, 2007

Related U.S. Application Data

(60) Provisional application No. 60/740,962, filed on Nov. 30, 2005.

(51) Int. Cl.
- H04Q 5/22 (2006.01)
- G06K 19/00 (2006.01)
- H04L 9/14 (2006.01)
- H04L 9/32 (2006.01)
- G08B 13/14 (2006.01)
- G07C 9/00 (2006.01)

(52) U.S. Cl. ............ 340/10.52; 340/5.22; 340/572.1; 340/825.56

(58) Field of Classification Search ..... 340/10.5–10.52, 340/5.2–5.28, 572.1–572.9, 5.92, 568.1, 340/10.4–10.42, 825.56; 235/385
See application file for complete search history.

(56) References Cited

U.S. PATENT DOCUMENTS

| | | | |
|---|---|---|---|
| 5,920,261 A * | 7/1999 | Hughes et al. | 340/568.8 |
| 6,166,650 A * | 12/2000 | Bruwer | 340/5.26 |
| 6,747,558 B1 * | 6/2004 | Thorne et al. | 340/551 |
| 6,961,000 B2 * | 11/2005 | Chung | 340/572.1 |
| 6,980,087 B2 | 12/2005 | Zukowski | |
| 7,009,526 B2 * | 3/2006 | Hughes et al. | 340/825.49 |
| 7,057,492 B2 * | 6/2006 | Jackson et al. | 340/5.61 |
| 7,079,009 B2 * | 7/2006 | Gallagher et al. | 340/10.2 |
| 7,145,961 B2 * | 12/2006 | Carbonari | 375/295 |
| 7,227,469 B2 | 6/2007 | Varner et al. | |
| 7,233,247 B1 | 6/2007 | Crossno et al. | |
| 7,342,481 B2 * | 3/2008 | Fischer et al. | 340/10.3 |
| 2003/0174044 A1 * | 9/2003 | Murray | 340/5.25 |
| 2005/0242963 A1 | 11/2005 | Oldham et al. | |
| 2006/0006986 A1 | 1/2006 | Gravelle et al. | |
| 2006/0015404 A1 * | 1/2006 | Tran | 705/14 |
| 2006/0181400 A1 | 8/2006 | Cox et al. | |
| 2006/0250241 A1 | 11/2006 | Renzetti et al. | |
| 2006/0255131 A1 * | 11/2006 | Stewart | 235/383 |
| 2007/0034686 A1 | 2/2007 | Davis et al. | |
| 2007/0115016 A1 | 5/2007 | Chang et al. | |
| 2007/0115125 A1 | 5/2007 | Lyon et al. | |
| 2007/0164863 A1 | 7/2007 | Himberger et al. | |

* cited by examiner

*Primary Examiner*—Benjamin C Lee
*Assistant Examiner*—Michael Shannon
(74) *Attorney, Agent, or Firm*—Gifford, Krass, Sprinkle, Anderson & Citkowski, P.C.

(57) ABSTRACT

A process for tracking an object within an inventory control space is provided. The space is illustratively a medical care delivery setting. An active radiofrequency (RFID) tag is encoded with a single-use code and associated with an inventory item. After a trigger event, the RFID tag transmits a modified broadcast. The single-use code that is a new number with at least one sparse digit or a new secondary number with a retained primary digit. An RFID tag configured to retain such a code scheme is provided. A hospital inventory item labeled with such an RFID tag is also provided.

11 Claims, 2 Drawing Sheets

ACTIVE RFID TAG WITH NEW USE AUTOMATIC UPDATING

RELATED APPLICATION

This application is a non-provisional application that claims priority of U.S. Provisional Application No. 60/740,962 filed Nov. 30, 2005, the contents of which are hereby incorporated by reference.

FIELD OF THE INVENTION

The present invention in general relates to active radio frequency identification (RFID) tagged goods and in particular to a reusable RFID tag automatically updating relation to a particular use event.

BACKGROUND OF THE INVENTION

A persistent problem with complex organizations is miscommunication as to required tasks to be performed. Such miscommunication is inherent when multiple individuals work on a particular project in shifts or from different locations. Such problems are exemplified in patient care settings associated with hospitals, nursing homes, and clinics where a potentially lethal error results from a patient receiving a medication or treatment intended for a prior bed occupant. Recently, electronic systems have been developed that involve a handshake or electronic identification exchange between electronic recipient and provider components. Such communications include a passive or active radio frequency identification tag communicating with a radio frequency transponder.

Unfortunately, a non-disposable RFID tag itself creates a measure of ambiguity as to whether the RFID tag has been coded for a new use or is still projecting an identification signal associated with a prior use. An electronic verification system that incorrectly assigns a pairing between a recipient and donor service pair enhances the likelihood of a process error that the electronic system was intended to preclude. Thus, there exists a need for a reusable radio frequency identification tag that automatically registers a new usage event definition upon registration of identification tag usage.

SUMMARY OF THE INVENTION

A process for tracking an object within an inventory control space is provided. The space is illustratively a medical care delivery setting. An active radiofrequency (RFID) tag is encoded with a single-use code and associated with an inventory item. After a trigger event, the RFID tag transmits a modified broadcast. The single-use code that is a new number with at least one sparse digit or a new secondary number with a retained primary digit. An RFID tag configured to retain such a code scheme is provided. A hospital inventory item labeled with such an RFID tag is also provided.

DESCRIPTION OF THE INVENTION

The present invention has utility in facilitating correct pairings of donor and recipient component pairs of a process so as to avoid uncertainty as to temporal reset of a reusable RFID labeled component. While the present invention is discussed hereafter in the context of a hospital setting, this is not intended to be a limitation upon the use thereof but rather to afford an intuitive and illustrative usage setting.

According to the present invention, a component is associated with an active RFID tag. The term "component" is used herein to define a consumable, a movable piece of equipment, or other item considered as inventory within an institution. In a healthcare setting, exemplary components illustratively include drugs, medical procedure kits, meals, ambulatory pieces of medical equipment, and the like.

According to the present invention, upon a predetermined use event, an active RFID tag broadcasts a code associated with the triggered event until disabled. In contrast to the prior art, an inventive RFID tag is rewritten with a new single-use code unmistakable with a previously used code.

Figure 1:
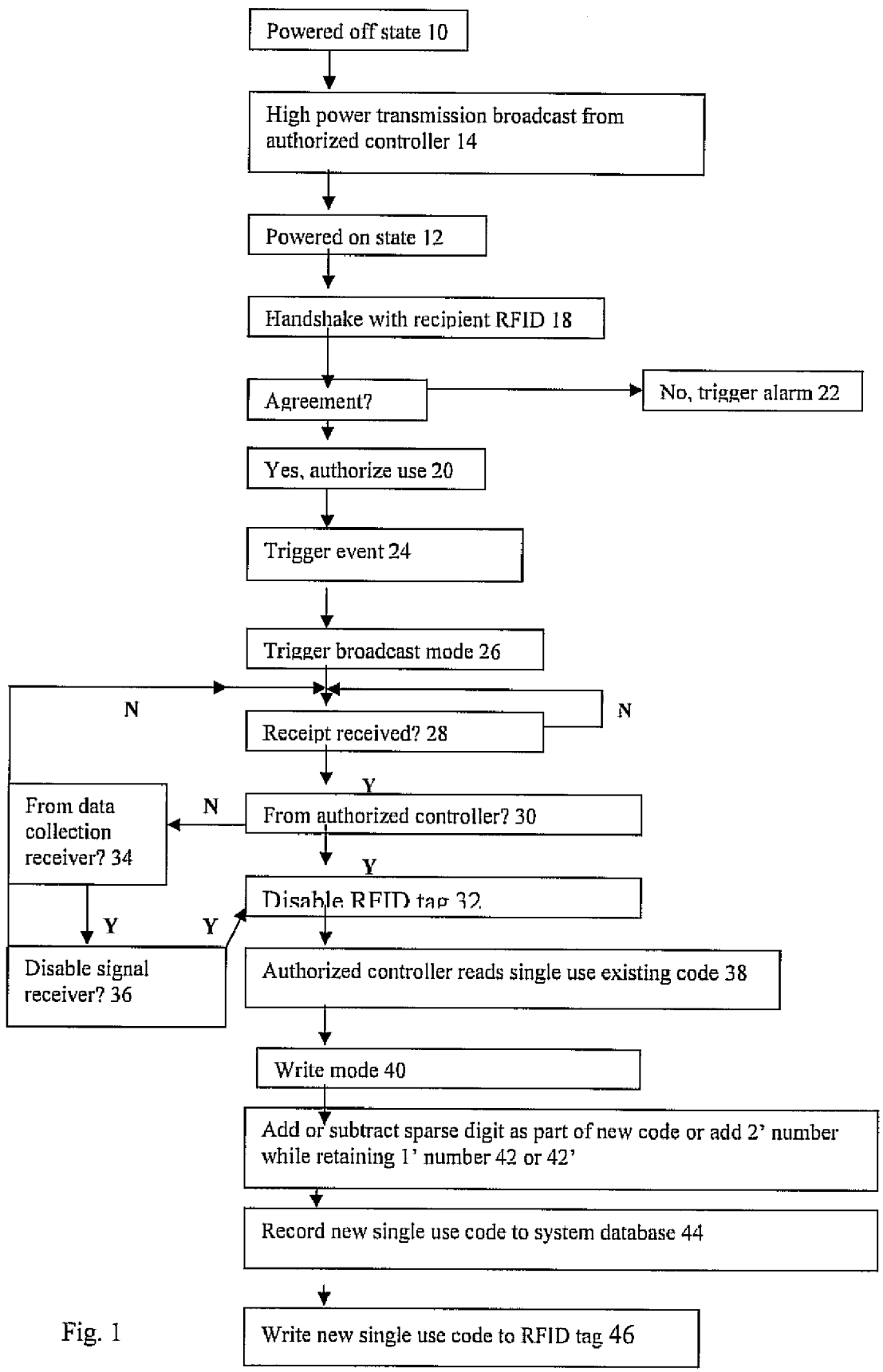
FIG. 1 is a schematic flowchart of an operating and recoding process for an active radiofrequency identification (RFID) tag according to the present invention.

Referring now to FIG. 1, an RFID tag is in a powered-off state 10 until activated to a powered-on state 12 in response to receipt of a high energy transmission broadcast from an authorized controller 14. Typically, an authorized controller is located at a facility exterior portal such that inventory entering a facility immediately becomes trackable within the facility. When the facility is a hospital setting, a portable piece of equipment or a medicament is recorded as entering the hospital and its whereabouts thereafter discernable.

Optionally, in response to an ordered treatment, an association is made between the RFID tag and an active component associated with a patient. As part of the procedure, a handshake is confirmed between the RFID tag and a recipient RFID 18. In the event the handshake 18 is successful, signaling agreement, usage of the RFID tagged package or device is confirmed electronically. Preferably, authorized use is also signaled in a human cognizable form illustratively including illumination of a light source, an auditory signal or communication of a text message to a personal digital assistant (PDA) or other portable electronic device 20. In the event that handshake attempt 18 indicates a discrepancy, an alarm is triggered 22 electronically, as well as in a human cognizable form, as detailed above. Regardless of whether a handshake and the resulting authorization 20 or alarm 22 events occur, at some point subsequent to RFID activation at step 12, a trigger event 24 occurs. A trigger event 24 is appreciated to be variable upon the nature of the product associated with the RFID tag. In a hospital setting a trigger event 24 illustratively includes opening of an instrument or medicament-containing Rim pouch, the RFID tag passing by a particular reading station, or the like. In response to the trigger event 24, the RFID transmits a unique single-use code in a broadcast mode 26. A vicinal receiver operates in a coordinated single-use with the RFID. The RFID tag remains in broadcast mode 26 and awaits receipt of a signal 28 indicating that the single-use code provided by the broadcast mode 26 has been received. In the event the RFID fails to receive a read receipt by a receiver, the RFID tag remains in broadcast mode 26. In the event a receiver transmitted reception signal is received by the RFID tag 28, the RFID tag determines whether the receipt came from the authorized controller at step 30. If the read receipt comes from the authorized controller, the RFID broadcast mode is disabled 32. In the event that the read receipt comes from a data collection receiver 34, the RFID tag is reprogrammed either to send a disable signal 36 to the RFID tag so as to disable the RFID tag 32, else the data collection receiver retained the RFID tag in broadcast mode 26. A data collection receiver being distinguished from the authorized controller in being associated with a location to provide an electronic log of RFID operation; however, it is appreciated that in certain programmed noted, the data collection receiver is a duplicate authorized controller.

A disabled RFID tag at step 32 is then recoded for reuse. The present invention operates to recode a non-disposable RFID tag to eliminate the ambiguity associated with a central database lagging in RFID tag update information. The authorized controller reads the expended single-use event code from the RFID tag 38. The RFID tag receives a command code from the authorized controller placing the RFID tag in a write mode 40. The single-use event code read at step 38 is stored within the authorized controller or a database in communication therewith. The read single-use code is then used in the creation of a new single-use code. A new single-use code includes a sparse number added to the expended single-use code read by the authorized controller 42. The sparse number adds or subtracts at least one digit relative to the read single-use code so as to preclude mistake or counterfeiting. In contrast, use of random number generators or other techniques to simply refill each numerical coding bin making up a single-use code retains a finite likelihood of a coding ambiguity, as well as lacking a quickly parsable chronology of RFID tag usage. As an alternative to the addition or subtraction of a sparse number, a primary number associated with the RFID tag is retained while a secondary number is rewritten 42. A secondary number is illustratively generated by a digital counter integral within the FD tag, the digital counter illustratively measuring rewrite cycles, a local clock signal or the like. It is appreciated that a digital counter functioning as part of a secondary number generated to be rewritten along with a retained primary number operates either alone or in combination with a random number generator. The new single-use code recorded to the authorized controller or the database 44 and is then written to the RFID tag 46. Depending on the location of intended use of the new single-use coded RFID tag, the tag is either placed in powered-off state 10 or directly into an energized state 12.

Within a hospital setting, writing of a new single-use code to an RFID tag illustratively occurs in a designated area such as a clean room where replenishment or cleaning of equipment occurs. Alternatively, in the case of an equipment lease, removal of the equipment from the leasehold area is the location for RFID tag rewrite.

Figure 2:
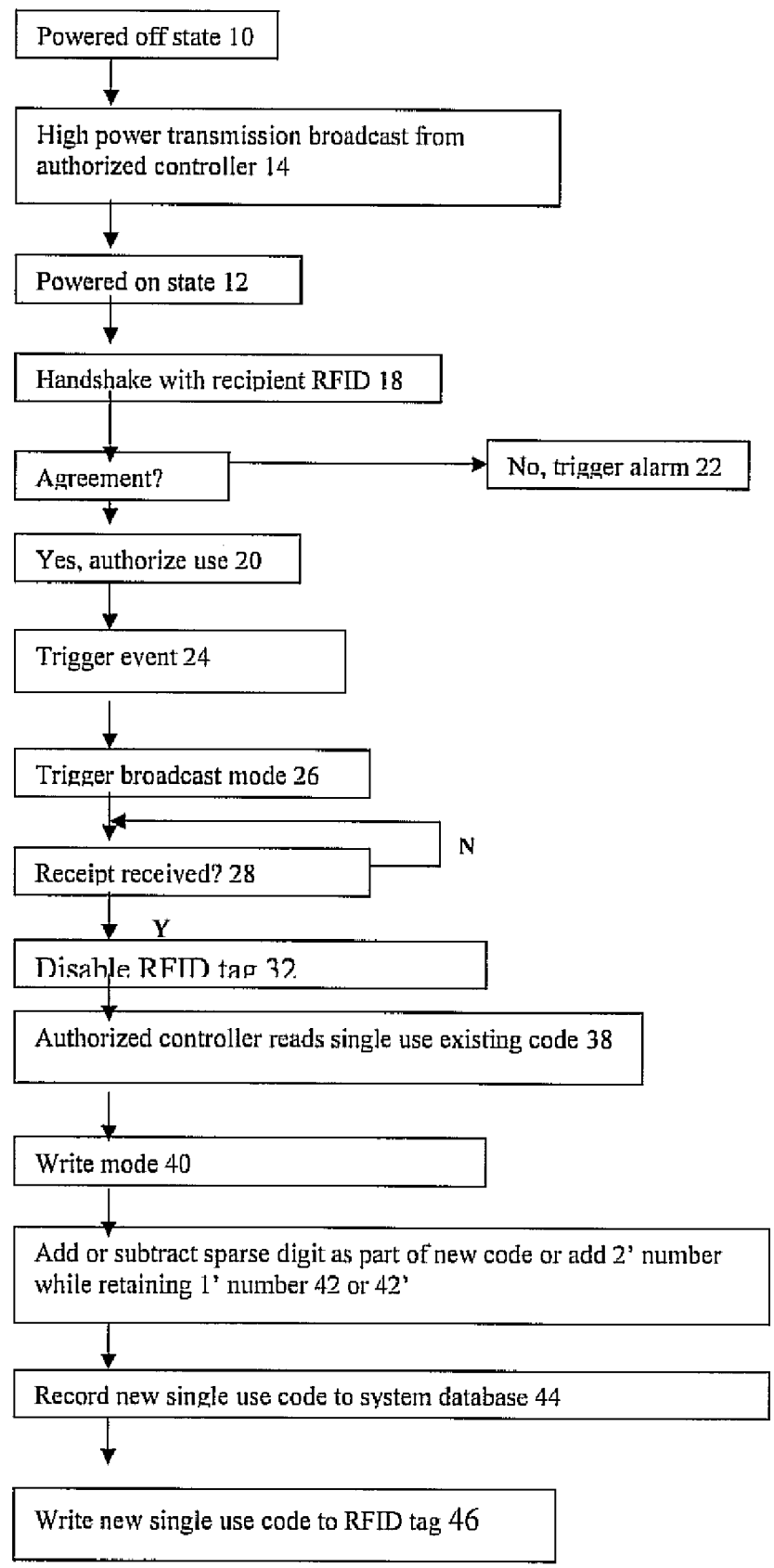
FIG. 2 is a schematic flowchart of an operating and recoding process for an active radiofrequency identification RFID tag in which the tag trigger event receipt disables the tag to provide a time and location best signal receipt signature of the triggering event.

In addition to the operation detailed in FIG. 1, it is appreciated that a trigger event 24 has the effect of disabling the RFID tag 32 upon receipt by an authorized controller 30 such that the time and location of the last signal received from the RFID tag is indicative of the triggering event. It is appreciated that in such a mode of operation, steps 30, 34 and 36 are not required, yet the system of FIG. 1 otherwise remains operative, as shown in FIG. 2 where like numerals correspond to those detailed with respect to FIG. 1.

The foregoing description is illustrative of particular embodiments of the invention, but is not meant to be a limitation upon the practice thereof. The following claims, including all equivalents thereof, are intended to define the scope of the invention.

The invention claimed is:

1. A process for tracking an object within a space comprising:
    encoding a single-use code in an active RFID tag associated with the object;
    controlling a broadcast of the single-use code in response to a trigger event; and
    writing a new single-use code to said RFID tag in response to the trigger event, the new single-use code being an alphanumeric code selected from:
        (a) new number with at least one sparse digit, such that a single additional digit is added to the single-use code each time a new single-use code is generated; or
        (b) a retained primary digit and a new secondary number generated by a counter that measures the quantity of rewrites to said RFID tag;
    wherein said new single-use code is capable of communicating parsable chronology of RFID tag usage.

2. The process of claim 1 wherein the step of controlling the broadcast is activating broadcast of the single-use code.

3. The process of claim 1 wherein the step of controlling the broadcast is deactivating broadcast of the single-use code.

4. The process of claim 1 wherein said counter is within said RFID tag.

5. The process of claim 1 wherein said counter measures time.

6. The process of claim 1 further comprising a random number generator operating in conjunction with said counter.

7. The process of claim 1 further comprising a read receipt between said RFID tag and a data collection receiver.

8. The process of claim 7 wherein said RFID tag remains in broadcast mode of the single-use code until said read receipt is communicated from said data collection receiver to said RFID tag.

9. The process of claim 1 further comprising recording the new single-use code to an authorized controller in communication with said RFID tag or a database in communication with said authorized controller.

10. A reusable RFID tag comprising:
    a power source;
    a transceiver; and
    a single-use rewritable code varying in response to a trigger event from preceding codes by:
        (a) at least one sparse digit, such that a single additional digit is added to the single-use code each time a new single-use code is generated; or
        (b) a retained primary numeral and a new secondary number generated by a counter that measures the quantity of rewrites to said RFID tag;
    wherein said new single-use code is capable of communicating parsable chronology of RFID tag usage.

11. A hospital inventory item labeled with an RFID tag according to claim 10.

* * * * *

UNITED STATES PATENT AND TRADEMARK OFFICE
CERTIFICATE OF CORRECTION

PATENT NO.       : 7,636,032 B2
APPLICATION NO. : 11/565129
DATED            : December 22, 2009
INVENTOR(S)      : Kantrowitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Ninth Day of November, 2010

David J. Kappos
*Director of the United States Patent and Trademark Office*